United States Patent

Edwards et al.

[11] Patent Number: 5,846,444
[45] Date of Patent: Dec. 8, 1998

[54] SURFACE TREATMENT OF GLASS

[75] Inventors: Stephen P. Edwards, Ogdensburg; Donald B. Kloeber, Big Flats; Joseph W. Neubert, Potsdam; Stephen R. Ormsby, Painted Post, all of N.Y.

[73] Assignee: Corning Incorporated, Corning, N.Y.

[21] Appl. No.: 711,352

[22] Filed: Sep. 5, 1996

Related U.S. Application Data

[60] Provisional application No. 60/004,712 Oct. 3, 1995.

[51] Int. Cl.[6] .................. B44C 1/22; B24B 7/19
[52] U.S. Cl. .................. 216/90; 216/91; 216/96; 216/97; 156/345; 65/31; 65/61
[58] Field of Search .................. 216/90, 96, 97, 216/91; 65/31, 61; 156/345

[56] References Cited

U.S. PATENT DOCUMENTS

| | | | |
|---|---|---|---|
| 2,143,796 | 1/1939 | Phillips | 65/31 |
| 3,023,139 | 2/1962 | Tetterode | 216/90 |
| 3,284,181 | 11/1966 | Harrell et al. | 65/31 |
| 5,246,540 | 9/1993 | Soda | 216/91 |

Primary Examiner—C. Warren Ivy
Assistant Examiner—D. Margaret M. Mach
Attorney, Agent, or Firm—Milton M. Peterson

[57] ABSTRACT

A method and apparatus for treating a surface on a glass article with a fluid. The article is surrounded by a containment system for the treating fluid and the fluid is continuously agitated by an agitator.

17 Claims, 2 Drawing Sheets

SURFACE TREATMENT OF GLASS

This application claims the benefit of U.S. provisional application No. 60/004,712, filed Oct. 3, 1995, entitled SURFACE TREATMENT OF GLASS, by Stephen P. Edwards, Donald B. Kloeber, Joseph W. Neubert and Stephen R. Ormsby.

FIELD OF THE INVENTION

Method and apparatus for treating a large glass article to remove a surface layer by chemical action.

BACKGROUND OF THE INVENTION

A major attribute of most commercial glasses is good chemical durability, that is, resistance to weathering and chemical attack. This is particularly true of glasses that are based on silica as a glass former.

Resistance to chemical attack, while critical to successful use of glass articles, nevertheless can pose a finishing problem. Frequently it becomes desirable, if not essential, to remove a surface layer on a glass article. One reason may be to provide a smooth surface. Another reason is to remove surface flaws, and thereby strengthen or fortify the article.

Polishing is a time-honored practice employed to impart a smooth surface. However, it is time consuming and expensive, particularly where large glass articles are involved.

Prominent among the few chemical materials capable of attacking a glass surface are certain fluorides. In particular, hydrofluoric acid is well known as a solvent for silica-containing glasses. However, for ease of control and for safety purposes, it is common place to employ a less vigorous reactant, ammonium bifluoride. In any case, the etching procedure has become known as "acid etching".

Acid etching is common practice in the glass art to polish and/or strengthen glass products. A glass article is submersed in a large tank of active fluoride solution for a predetermined time to etch the article surface. The article is then washed to remove residue and fluoride from the treated surface. It becomes increasing difficult to employ such a procedure as the size of the glass article increases.

The present invention arose from a need to fortify the surface on a large telescope mirror blank having a 8.1 meter diameter. Surface fortification by removal of surface flaws was necessary to permit safe transportation of the mirror for finishing. It was also necessary to insure against possible fracture in assembly and use of the mirror. Known polishing and acid etching procedures were impractical to use in view of the size and weight of the mirror.

The present invention provides a novel method and apparatus for acid etching such a large glass article. It provides a procedure that minimizes the amount of etchant fluid required and the cost of equipment. Further, the method and apparatus are not limited as to the diameter and/or thickness of the glass article. They are applicable to a variety of surfaces including piano, concave and convex. Finally, the glass article need not be lifted or moved during operation of the etching process, thereby reducing handling risks.

SUMMARY OF THE INVENTION

The invention resides in part in a method of treating a surface on a glass article which comprises, (a) positioning the glass article on a support with the surface to be treated facing upwardly, (b) surrounding the periphery of the glass article with a layer of material that forms a fluid-tight seal therewith, that rises above the level of the highest point on the glass surface, and that is resistant to attack by the treating material, (c) covering the glass surface with a glass treating material to a level above the highest point on the glass surface, (d) continuously agitating the treating material to uniformly treat the glass surface.

It further resides in an apparatus for carrying out the method which comprises (a) a support member for the glass article, (b) a vertical fluid containment system surrounding the glass surface periphery and adapted to form a fluid tight seal therewith, the system comprising a vertical wall that rises above the highest point on the article to be treated and having an inner surface that is resistant to attack by the treating fluid, (c) an agitator supported above and in alignment with the support member and adapted to be lowered into close proximity to the surface to be treated, and (d) means for imparting motion between the agitator and the support.

PRIOR ART

Prior art of possible relevance is provided separately.

DESCRIPTION OF THE INVENTION

Figure 1:
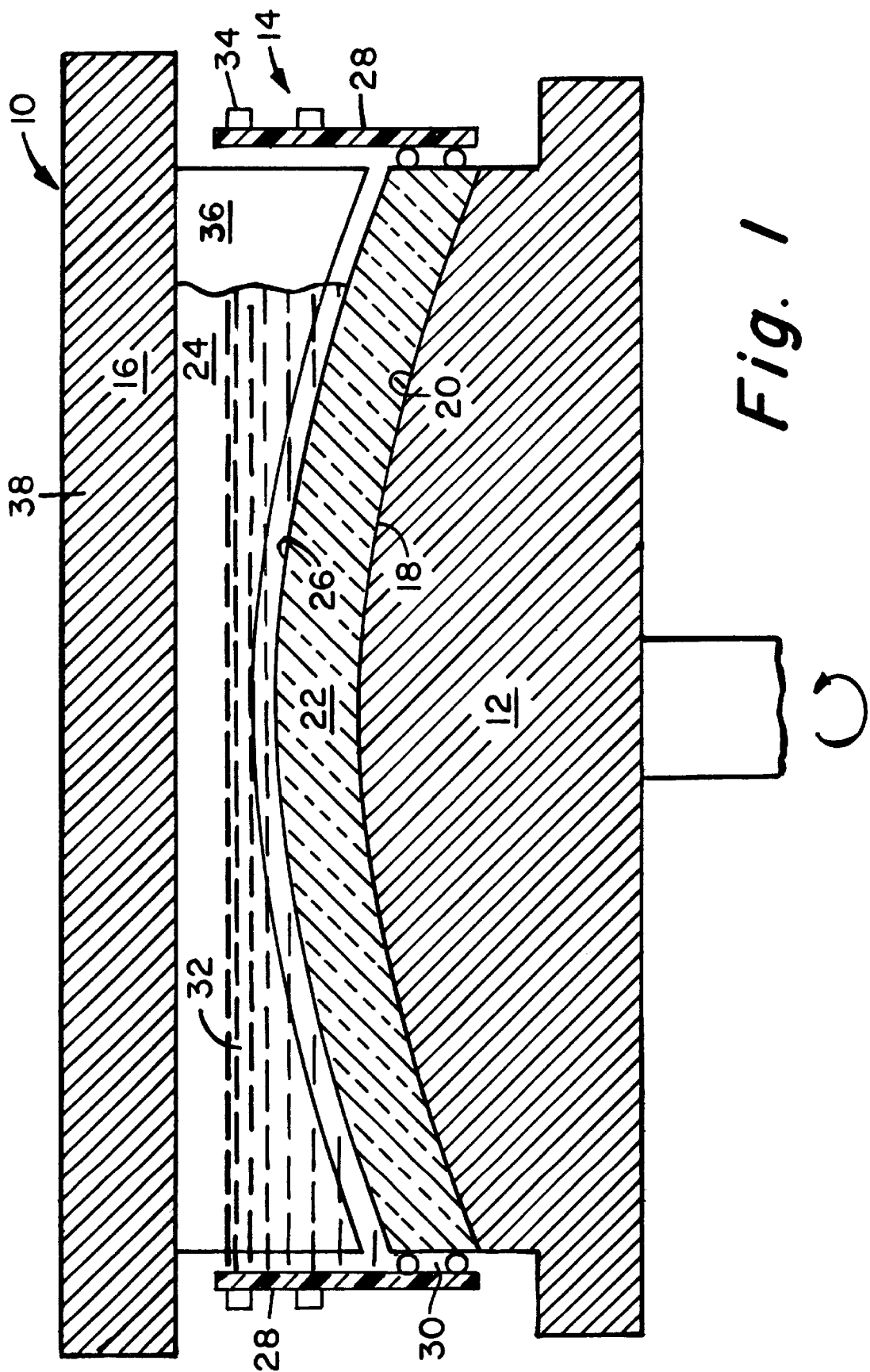
FIG. 1 is a schematic view in cross-section illustrating the invention.

FIG. 1 is a schematic view in cross-section showing the essential components of an apparatus, generally designated 10, for practicing the invention. The key components of apparatus 10 are a support member 12, an etchant containment system 14 and an agitator 16.

Support member 12 is shown as a turntable of the type commonly used for blocking a glass mirror during grinding and polishing. Member 12 may be stationary, but it is generally preferred that it be a turntable capable of rotary movement. Support member 12 is here shown as having a supporting surface 18 that conforms to the concave undersurface 20 of glass article 22. Article 22 is here shown as a concave-convex glass mirror.

Containment system 14 is a key feature of the invention. It must contain a pool of etchant 24 on the upper surface 26 of glass mirror 22. It embodies a vertical band or wall 28 that surrounds article 22 and forms an acid resistant seal 30 therewith. Wall 28 extends upward to a horizontal plane above the upper level 32 of etchant pool 24.

Wall 28 may be composed of any otherwise suitable material that is resistant to the etchant. This may be polypropylene in the case of fluoride etchants. Wall 28 may be physically reinforced by annular bands 34 about its outer surface. Seal 30 may be provided by a closed cell foam, or by inflatable rubber tubing as shown in FIGS. 1 and 2.

In its simplest form, agitator 16 may be a blade 36 mounted on a support beam 38. This assembly may be stationary if article support 12 is a turntable. Otherwise, agitator 16 must be adapted to rotate. It is essential that there be relative motion between support 12 and agitator 16. Blade 36, or other agitating member, will also be an etchant-resistant material, such as polypropylene.

Figure 2:
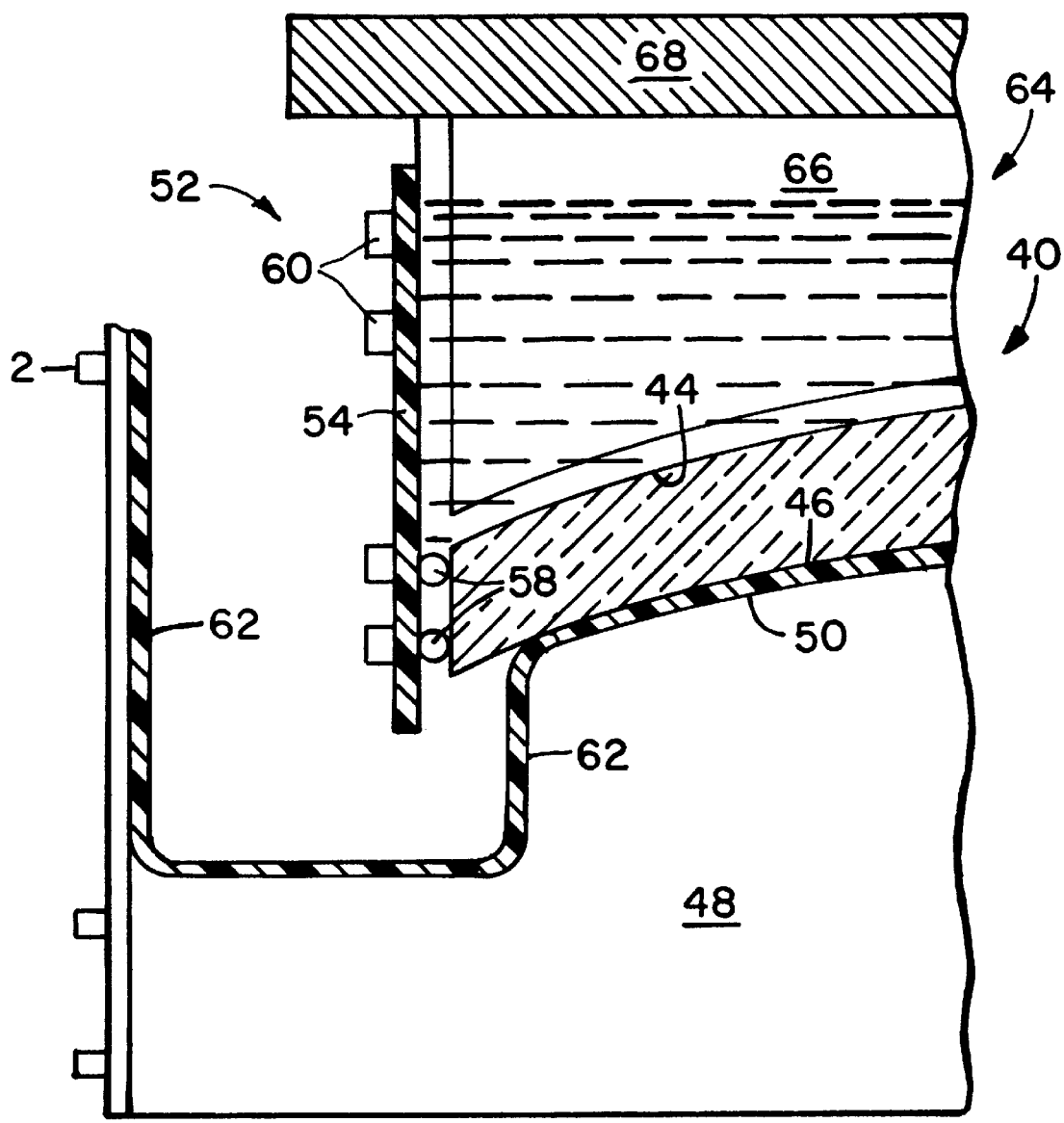
FIG. 2 is a partial view in cross-section of a containment system for practice of the invention.

FIG. 2 is a partial view in cross-section. It shows one side of an apparatus 40 designed for etching a glass telescope mirror blank. The blank has a convex upper surface 44 that is to be fortified by etching. Concave undersurface 46 rests on a support block 48. Block 48 has a convex surface 50 that conforms to concave surface 46.

A containment system 52 embodies an annular, vertical, polypropylene wall 54. Wall 54 extends from below the blank to a horizontal plane above a pool of etchant fluid. The pool is formed on, and covers, upper surface 44 of mirror the blank. Inflatable rubber tubes 58 extend around the periphery of the blank. They form an etchant-tight seal between wall 54 and the blank when inflated. This is essential to prevent leakage. Wall 54 may be reinforced with annular straps 60. Finally, a backup or auxiliary plastic container 62 covers support block 48 and surrounds wall 54 as an emergency measure.

Agitator 64 has a blade 66 mounted on a support beam 68. Blade 66 is fabricated from an etchant-resistant material, such as polypropylene. It has a concave under edge that conforms to the curvature of surface 44 on the blank, and is spaced a small distance therefrom. Agitator 64 may be stationary, or may be provided with means, not shown, to impart rotary motion.

Agitation of the etchant is a key factor in obtaining uniform etching action. Static etching, that is without agitation, was initially tried and found to be unsatisfactory. The etched surface thus produced tended to be uneven and bumpy. It was thought this condition could be occasioned by deposits on the glass surface causing uneven etching.

To test this theory, provision was made to maintain the etchant in an agitated state. The success of this experiment indicated two key requirements for successful etching. These are sufficient etchant and sufficient agitation to keep reaction product from depositing or forming on the glass surface during the etching process.

Tests were conducted on silica glass samples with a rotating blade extending across the diameter of the test sample as shown in FIG. 1. This work indicated that movement of the blade at 1 RPM while the blade was suspended about 3 mm (⅛") above the glass surface provided adequate agitation.

Strength measurements were made on the test pieces to determine the benefits of the etching process. The results of these tests were compared with the results of similar tests carried out on unetched samples. The comparisons showed a mean strength increase of nearly 1000 psi over the unetched samples.

Based on this work, the surface of an 8.1 meter telescope mirror blank was strengthened by etching in accordance with the described procedure. The mirror was positioned on a blocking turntable and surrounded with a polypropylene wall as shown in FIG. 2. 8650 liters (2300 gallons) of ammonium bifluoride was poured over the glass surface. It was retained there by the polypropylene wall and inflated rubber seals. A stationary blade, such as shown in FIG. 2, was held at about 3 mm (⅛") above the glass surface while the turntable was rotated at 1 RPM.

The etching action is continued for a period of time calculated to provide the etching action necessary to remove a desired amount of glass. This amount is based on the mirror design. For example, about a 0.033 mm (0.013") thickness of glass was removed in a 20 hour period including time for etchant removal. This etching action provided a smooth, uniform glass surface on the mirror, and fortified the mirror for transportation to finishing facilities and installation in the telescope mirror cell.

We Claim:

1. Method of treating a surface on a glass article which comprises,
   (a) positioning the glass article on a support with the surface facing upwardly,
   (b) surrounding the periphery of the glass article with a layer of material that forms a fluid-tight seal therewith, that rises above the level of the highest point on the glass surface, and that is resistant to attack by the treating material,
   (c) covering the glass surface with a glass treating material to a level above the highest point on the glass surface,
   (d) continuously agitating the treating material to uniformly treat the glass surface.

2. A method in accordance with claim 1 which further comprises
   (e) supporting an agitator above the glass surface, the agitator having a surface that conforms to the glass surface,
   (f) lowering the agitator into the liquid, but not contacting the glass,
   (g) imparting motion between the agitator and the glass article.

3. A method in accordance with claim 2 which comprises imparting a rotary motion between the agitator and the glass article.

4. A method in accordance with claim 1 which comprises covering the glass surface with a glass etchant to remove a surface layer from the glass.

5. A method in accordance with claim 4 which comprises surrounding the periphery of the glass article with a layer of polypropylene.

6. A method in accordance with claim 4 which comprises covering the glass surface with a solution of ammonium bifluoride.

7. A method in accordance with claim 4 which comprises covering the glass surface with sufficient etchant so that the amount of glass dissolved does not exceed the solubility of the etching product in the etchant.

8. A method in accordance with claim 1 which further comprises providing an auxiliary reservoir that surrounds the glass article and the material that forms a fluid-tight seal therewith, and that is exterior to and spaced from the material.

9. A method in accordance with claim 1 which comprises treating a telescope mirror composed of a fused silica-type glass.

10. A method of strengthening a glass article by removing a surface layer from the article which comprises:
    (a) positioning the glass article on a support with the surface facing upwardly,
    (b) surrounding the periphery of the glass article with a layer of material that forms a fluid-tight seal therewith, that rises above the level of the highest point on the glass surface, and that is resistant to attack by the etching material,
    (c) covering the glass surface with a glass etching material to a level above the highest point on the glass surface,
    (d) continuously agitating the etching material to uniformly treat the glass surface.

11. An apparatus for treating a glass article by contacting a surface on the article with a treating fluid which comprises,
   (a) a support member for the glass article,
   (b) a vertical fluid containment system surrounding the glass surface periphery and adapted to form a fluid tight seal therewith, the system comprising a vertical wall that rises above the highest point on the article to be treated and having an inner surface that is resistant to attack by the treating fluid,
   (c) an agitator supported above and in alignment with the support member and adapted to be lowered into close proximity to the surface to be treated, and
   (d) means for imparting motion between the agitator and the support.

12. An apparatus in accordance with claim 11 wherein the vertical wall of the fluid containment system is composed of polypropylene.

13. An apparatus in accordance with claim 11 wherein the fluid tight seal in the fluid containment system is formed by inflated rubber tubing.

14. An apparatus in accordance with claim 11 wherein the support member for the glass article is a rotary turn table.

15. An apparatus in accordance with claim 11 wherein the agitator is supported by a member adapted to be rotated.

16. An apparatus in accordance with claim 11 wherein the agitator has a blade shape and extends across the glass article.

17. An apparatus in accordance with claim 11 which further comprises an auxiliary reservoir that surrounds the glass article and the fluid containment system, and that is exterior thereto and spaced therefrom.

* * * * *